Sept. 30, 1969  J. NYBERG  3,470,309
BILLING AND DECODING BOX
Filed April 28, 1967  5 Sheets-Sheet 1
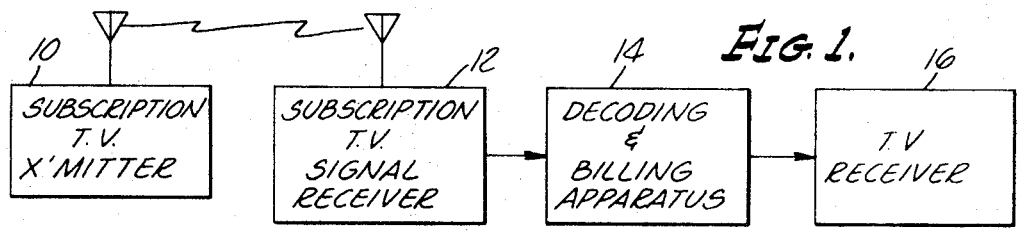
FIG. 1.
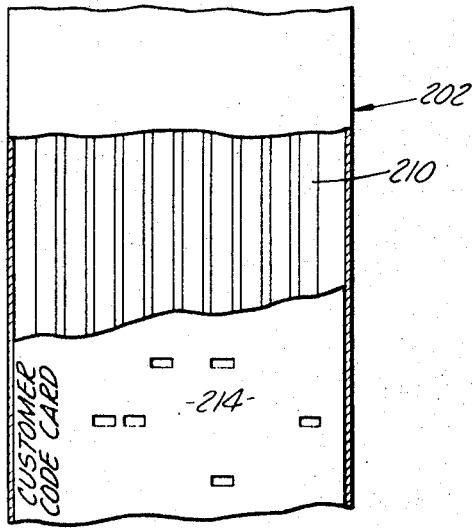
FIG. 7.
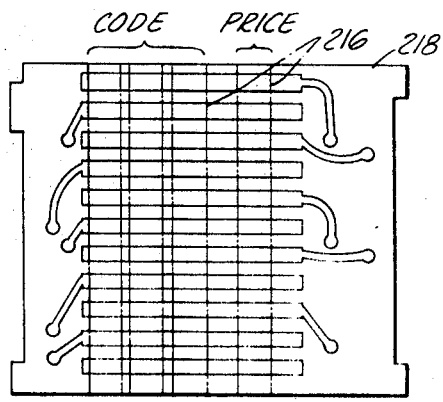
FIG. 8.
FIG. 10.
FIG. 9.
JOHN NYBERG
INVENTOR.
BY Lindenberg & Freilich
ATTORNEYS Sept. 30, 1969  J. NYBERG  3,470,309
BILLING AND DECODING BOX
Filed April 28, 1967  5 Sheets-Sheet 2

JOHN NYBERG
INVENTOR.

BY Lindenberg & Freilich

ATTORNEYS

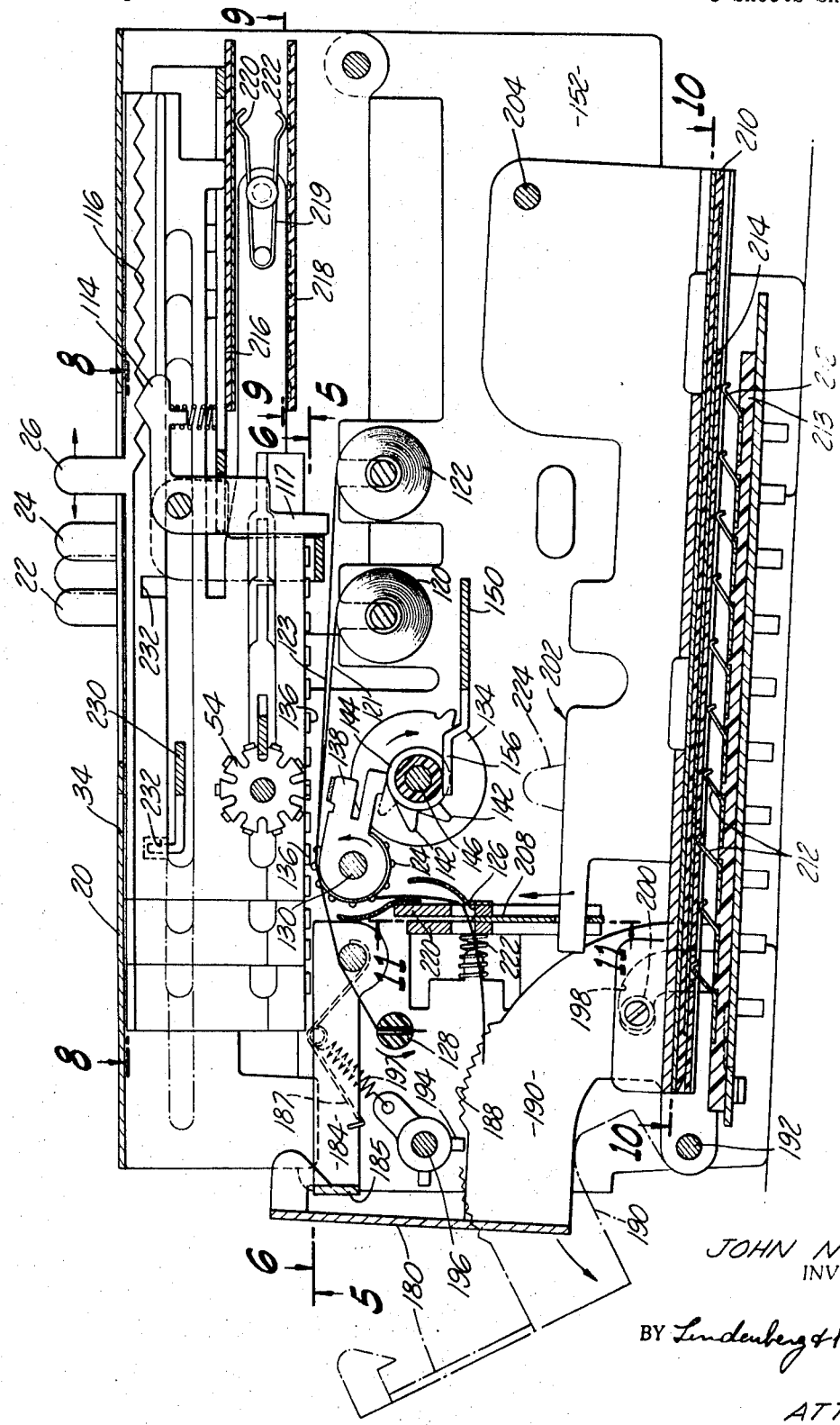

Sept. 30, 1969  J. NYBERG  3,470,309
BILLING AND DECODING BOX
Filed April 28, 1967  5 Sheets-Sheet 4

JOHN NYBERG
INVENTOR.

BY Lindenberg & Freilich
ATTORNEYS

Sept. 30, 1969  J. NYBERG  3,470,309
BILLING AND DECODING BOX
Filed April 28, 1967  5 Sheets-Sheet
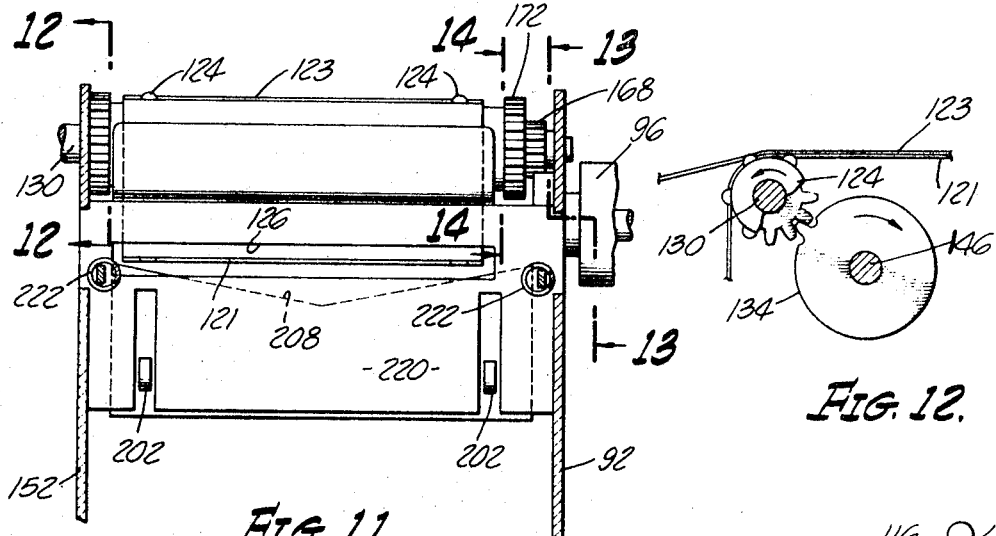
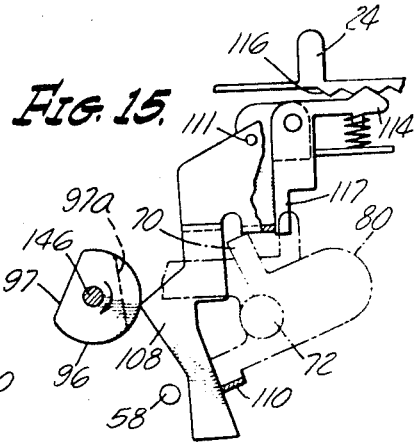
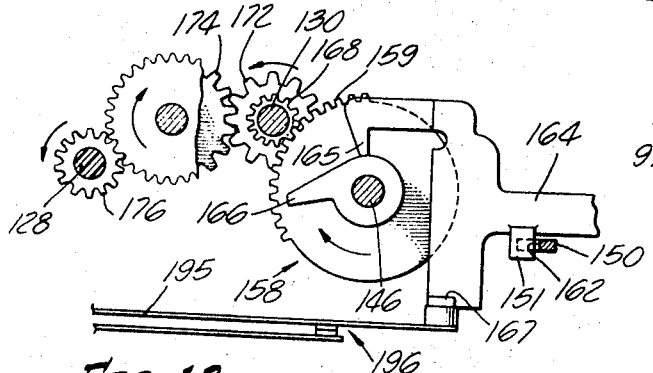
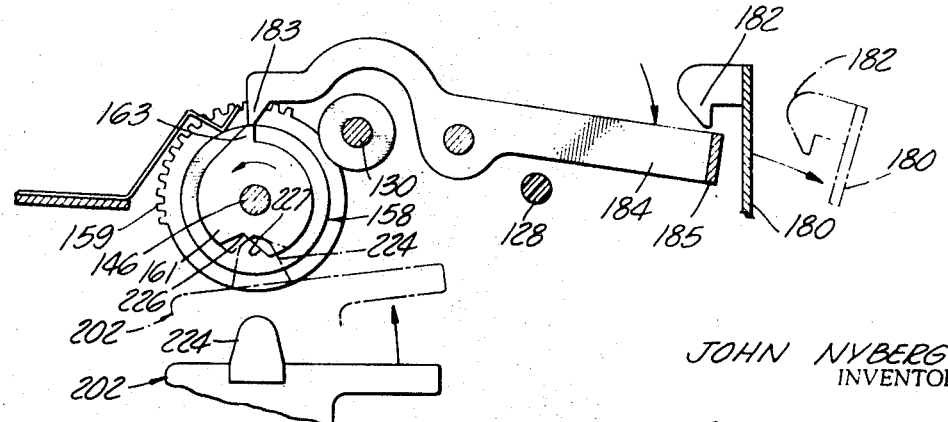
JOHN NYBERG
INVENTOR.
BY Lindenberg & Freilich
ATTORNEYS

United States Patent Office 3,470,309
Patented Sept. 30, 1969

3,470,309
BILLING AND DECODING BOX
John Nyberg, North Hollywood, Calif., assignor to International Telemeter Corporation, Los Angeles, Calif., a corporation of California
Filed Apr. 28, 1967, Ser. No. 634,674
Int. Cl. H04n 1/44
U.S. Cl. 178—5.1     16 Claims

ABSTRACT OF THE DISCLOSURE

A billing and decoding box for connection to a television receiver in a subscription television system to decode scrambled television signals and bill the subscriber. Code levers are set to the code which unscrambles a particular program, one character of the code being the price for viewing that program, and a button is pushed to deliver unscrambled television signals to the television set. The code and price are printed on a strip of paper which is later ejected from the box, and which serves as a bill which is paid by the subscriber.

BACKGROUND OF THE INVENTION

Field of the invention

This invention relates to charge meters and more particularly to billing apparatus for subscription television systems.

Description of the prior art

Subscription television coin boxes and billing apparatus are known which deliver decoded television signals for a predetermined period of time or which advance a billing tape when the decoding apparatus is used for a predetermined period of time. However, such apparatus generally does not automatically inform the subscriber of the charge for a particular program, regardless of its length, or provide a record of the programs and prices thereof which the subscriber has elected to receive which record serves as a bill.

SUMMARY OF THE INVENTION

One object of the invention is to provide a decoding and billing apparatus which automatically displays the price for receiving an entire program, which prints a bill showing the code settings and prices of programs received during the preceding billing period, and which guards against the inadvertent printing of a charge on the bill when the subscriber has neglected to change the code setting to that of the new program.

Another object of the present invention is to provide decoding and billing apparatus which simultaneously prints the charges incurred by the subscriber for each program accepted by him on a strip of paper which serves as his bill and on a strip of paper which is retained in the apparatus as a permanent record.

The foregoing and other objects of the invention are realized by a decoding and billing box which unscrambles television signals when levers are moved to set a proper code for that program and a button on the box is pushed. Pushing the button causes the passage of signals through the proper decoding paths to deliver decoded information signals to the television receiver, and also causes the printing of a billing charge on paper tape. At the end of a billing period such as one month, the subscriber opens a billing dooor which causes the ejection of a length of paper tape which shows billings to date.

The mechanism includes means for locking the code setting levers during printing to prevent a change in code setting until after the tape is printed. One of the characters of the code is a price so the subscriber always knows what the cost of the program will be. The code, including the price character, is recorded both on the billing tape given to the subscriber and on a separate master tape. The master tape is retained in the machine to enable occasional checking to make sure that the tape portions sent in by the subscriber constitute all of the billings he has incurred.

Novel mechanisms which implement the foregoing and other features, and a better understanding of the invention, will be obtained from the following description and claims taken in conjunction with the accompanying drawings.

BRIEF DESCRIPTION OF THE DRAWINGS

FIGURE 1 is a block diagram of a subscription television system including the decoding and billing apparatus of the present invention;

FIGURE 4 is a side view taken along the lines 4—4 of FIGURE 2, and illustrates the internal mechanism of the device;

FIGURE 7 is a view of a billing tape printed by the apparatus of the invention, which is ejected by the apparatus in the billing operation;

FIGURE 8 is a view taken along the lines 8—8 of FIGURE 4, showing the indicia which appear in the code windows to indicate code setting;

FIGURE 9 is a plan view taken along the lines 9—9 of FIGURE 4 showing the printed circuit code board of the device;

FIGURE 10 is a fragmentary plan view taken along the lines 10—10 of FIGURE 4 showing a customer code card positioned in the mechanism;

FIGURE 11 is an end sectional view taken along the lines 11—11 of FIGURE 4, showing the knife apparatus of the invention;

FIGURE 12 is a fragmentary view taken on the line 12—12 of FIGURE 11, showing the intermittant drive for the paper tapes;

FIGURE 13 is a fragmentary view taken on the line 13—13 of FIGURE 11, showing the drive apparatus for the billing operation;

FIGURE 14 is a fragmentary view taken on the line 14—14 of FIGURE 11 (note the direction of the view is opposite to that of the other side views), showing the door latch reset mechanism; and.

FIGURE 15 is a fragmentary view of the lockout mechanism which prevents moving of the code setting levers during the printing operation.

DESCRIPTION OF THE PREFERRED EMBODIMENTS

Figure 2:
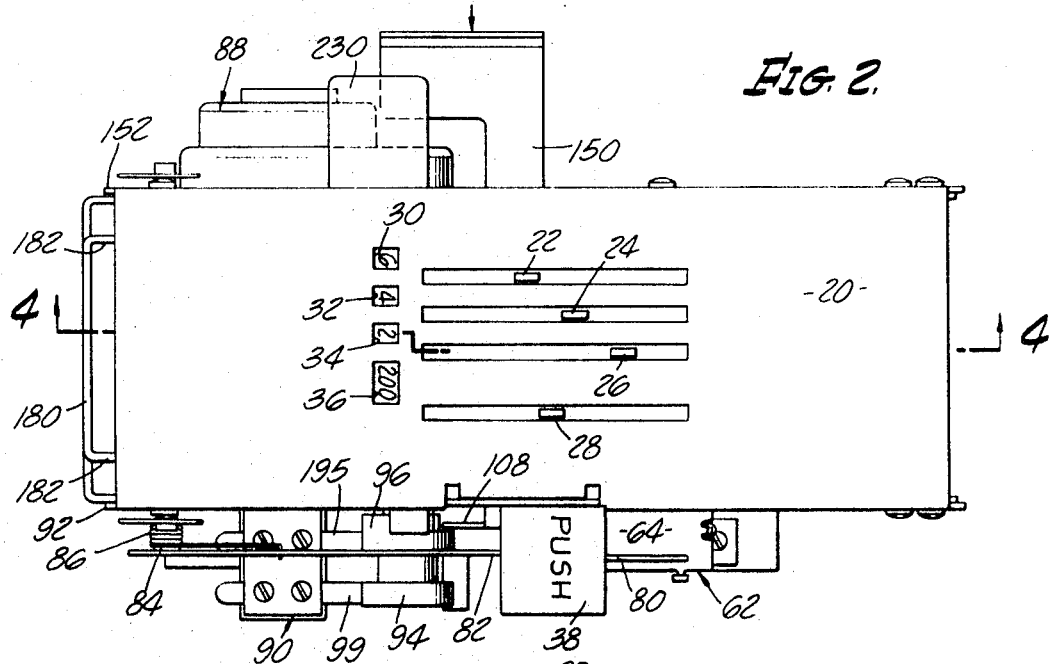
FIGURE 2 is a top plan view of the billing and decoding apparatus of the present invention, shown without a housing for enclosing the mechanism.

FIGURE 1 is a block diagram illustration of a subscription television system which may employ the embodiment of the invention to be described in detail herein. The overall system may be of the type described in patent application Ser. No. 558,401 entitled "Subscritpion Television System," by Abraham M. Reiter et al., filed June 17, 1966, wherein, as illustrated in the figure, encoded television signals are sent from a subscription television transmitter 10 and received by a subscription television signal receiver 12 which sends them through a decoding and billing apparatus 14 and thence to the television receiver 16. At the decoding and billing apparatus 14, four of ten possible tone filters are selected for processing the signals in order to reconstruct the signals and present an intelligible picture and sound. The coding information is presented as four characters which inform the subscriber of the positions at which four levers on the decoding and billing apparatus 14 are to be set, three of the four characters being digits having a value 0 through 9 and the fourth character being one of ten prices. The four code characters for each program may be published in the daily newspaper, sent to the subscriber at monthly intervals, transmitted to him on a "barker box" placed on his receiver, or delivered by other means. If the subscriber desires to watch a program, he sets the four levers on the decoding and billing apparatus 14 to the code of the program, presses a button to indicate that he accepts the cost therefore, and then receives the program. When the subscriber later wishes to watch another program, he must change the levers to a new setting, the changing of the levers deactivating the decoding apparatus until the button is pressed again.

The present invention is directed to the decoding and billing apparatus 14, which is shown and described in detail in the specification and drawings.

FIGURE 2 illustrates the appearance of the top of a billing apparatus constructed in accordance with this invention, but without an enclosure for surrounding the apparatus. A top plate 20 has slots therein from which code slide levers 22, 24, 26 and 28 protrude to enable the subscriber to move elongated slides to set a code. The code characters appear in four top plate openings 30, 32, 34 and 36, respectively. Three of the code characters, which appear in openings 30, 32 and 34, are numbers and a fourth character, which appears in opening 36, is a price. There is a direct correspondance between the position of each lever and the code character shown in the opening associated with it.

After the code is set, a subscriber may indicate acceptance of the indebtedness indicated by the price shown through opening 36, by pushing a button 38. Pushing the button 38 causes the connection of the decoding apparatus for unscrambling the television signals and also causes the activation of printing apparatus which prints the code of the program on paper tape within the decoding and billing box. After each new setting of a code and pressing of the button, the paper tape advances to present a fresh surface at the printing position. At intervals such as one month, when payment must be made for programs accepted during the preceding billing period, the subscriber opens a door 180 through which is ejected a record showing the codes printed on the tape since the last ejection, and the subscriber must pay the total of the price characters shown on the tape. The subscriber sends this paper slip together with his check to the subscription television company.

A master record is kept witin the apparatus to enable the subscription company to compare the bills paid by the subscriber with the codes actually printed by the apparatus. In addition to ejecting his bill the subscriber inserts a punched card into the box. The card is sent to each subscriber at monthly intervals to change the decoding paths in the apparatus so as to prevent reception of programs through unauthorized devices.

Figure 3:
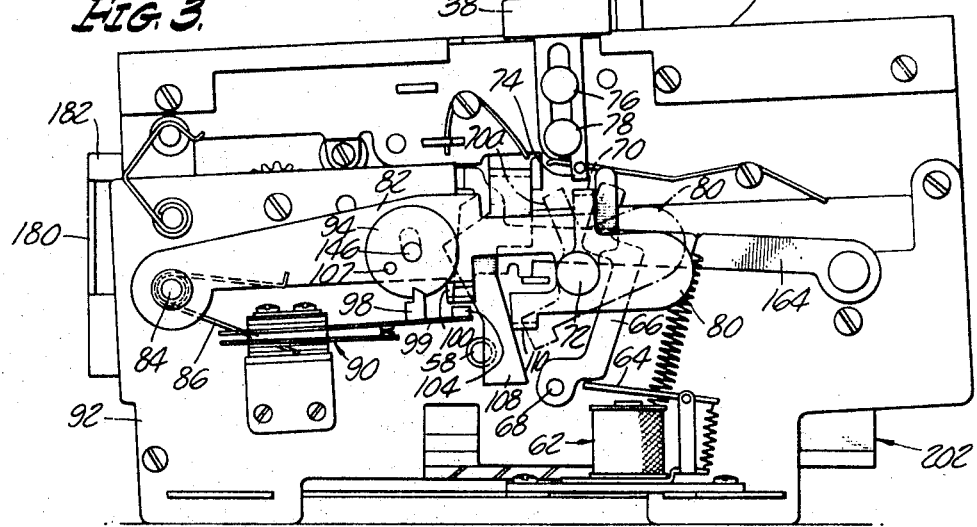
FIGURE 3 is a side elevation view of the apparatus of FIGURE 2.

A brief description of the operations of the apparatus will aid in understanding the more detailed description which will follow. When the code slide levers 22, 24, 26 and 28 are properly set for the program being transmitted, a relay 62 shown in FIGURE 3 is closed which permits operation of the device when the push button 38 is pressed. When the button 38 is pressed, a motor shaft 146 makes one complete revolution and in doing so causes the release of decoding switch button 58 to permit decoding of the television signals, causes the printing of the code characters on paper and advances the paper. FIGURE 4 illustrates a printing cylinder 144 on the motor shaft 146 which has printing cams 142. The cams 142 lift printing hammers 138 to press two strips of paper 121 and 123 upwardly against type 136 on the bottom of the four code slide levers to imprint the code, including the price, on the paper. After the imprinting, a tooth wheel 134 shown in FIGURE 12, which is mounted on the motor shaft 146 turns and advances a sprocket wheel 124, which advances the paper tapes 121 and 123 so that they can receive a new impression when another program is to be received. At the end of a billing period such as one month, the subscriber opens a billing door 180 shown in FIGURE 4 to cause the the ejection of a length of the paper 121 from the apparatus.

A detailed description of the apparatus shown in the figures will now be given to illustrate a preferred embodiment of the invention. FIGURE 3 is a side view of the apparatus comprising a side wall support 92 and top plate 20 which serve as a frame to hold the rest of the mechanism. When the code slide levers 22 through 28 are positioned so as to properly decode the program being transmitted, the relay 62 is energized and its armature 64 moves down. A restraining arm 66 is then enabled to pivot about its pivot end 68 by gravity force and allow a setting arm 70, which is pivotly supported on a pivot pin 72, to rotate from the position indicated at 70a to the position shown at 70. The arm 70 is then under an extension 74 of the push button 38. It may be noted that the arm 70 has a bulge or weighted section 80 which insures that it moves to the position indicated at 70. The push button 38 is slideably mounted on two pins 76 and 78, and when the button is depressed it pushes down on arm 70.

The pivot pin 72 of the arm 70 is mounted at one end of a switch actuating arm 82. The switch actuating arm is pivotly mounted on a pivot 84 to the side wall, and is spring biased upwardly by a torsion spring 86. When the push button 38 is pushed down, the extension 74 pushes down on the arm 70, which has been permitted to rotate thereunder by actuation of the relay 62 and consequent movement of the levers 66. The downward push on the arm 70 causes the switch actuating arm 82 to be pivoted downwardly about the pivot 84.

FIGURE 2 illustrates a motor 88 which turns the paper drive and print drive mechanisms. Referring again to FIGURE 3, switch 90, which is mounted on the side wall 92 opposite the motor 88, is electrically connected in series between a power line (not shown) and the motor 88 so that the motor 88 is energized when the switch is closed. The motor includes reduction gearing and has an output shaft 146 on which are mounted various cams and gears for printing and advancing the paper tape and resetting the mechanism, including a latching cam 94. A cam rider 98 is fixed to one end of a switch blade 99 of the switch 90, in a location for engaging the periphery of the latching cam 94. The latching cam 94 has a notch in its periphery into which the cam rider 98 fits when the motor is in the "off" position. If the blade 99 is depressed even briefly, the latching cam 94 will turn and the cam rider 98 cannot return to the notch until the motor shaft 146 has made a complete revolution.

Figure 3A:
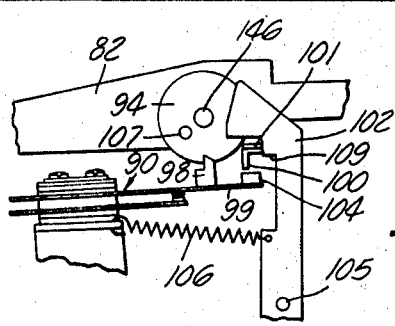
FIGURE 3A is a partial view of the motor switch retaining mechanism of FIGURE 3.

The switch retaining arm 82 has a switch actuator extension 100, seen more clearly in FIGURE 3A, which rests on a contact button 104 of the switch 90. When the push button 38 moves downwardly and causes the switch retaining arm 82 to move down, the extension 100 thereof depresses the contact button 104 and starts the motor, and the cam rider 98 rides on the latching cam 94 to make the motor shaft 146 turn a complete revolution. In order to assure that the switch blade 99 will be held down long enough for the cam rider to clear the notch in the matching cam, a retaining pawl 102 pivoted about the pivot 105 is provided which is biased by a coil spring 106 in a counter-clockwised direction. When the switch activating arm 82 moves down even momentarily, a tab 101 thereon moves below a retaining surface 109 on the retaining pawl 102 and the switch retaining arm 82 is locked in a downward position.

After the motor shaft makes approximately a one-half turn, a pin 107 on the latching cam contacts the retaining pawl 102 and pivots it to release the tab 101 and allow the arm 82 and the actuator extension 100 to move up. The cam rider 98 can then move into the notch in the latching cam 94 and stop the motor. It should be noted that after the motor stops, the foregoing operation will not occur again even if the push button is pressed again. This is because the arm 70 remains rotated in the position indicated at 70a in FIGURE 3 and the push button cannot come in contact with the arm again. This condition will prevail until such time as the code slide levers are moved to a new position.

During the major portion of the time when the motor shaft 146 is turning the code slide levers 22 through 28 can be moved to set a new code. The mechanism for preventing such movement is shown in FIGURE 15. The lockout cam 96 which is mounted on the motors shaft 146 abuts a slide lockout lever 108 which is pivoted at pivot 111. The cam 96 holds the lever 108 so that it pushes tab 110 of the setting arm 70 into the lockout position shown at 70a. The mechanism then cannot be actuated when the push button is pressed. However, when the motor comes to rest, a cut-away portion 97 of the lockout cam will be in the position indicated at 97a and the lockout lever 108 can pivot clockwise into the cut-away portion and release tab 110. The arm 70 can then rotate to the position shown at 70 wherein the mechanism can be actuated when the push button is pressed.

While the slide lockout lever 108 can pivot clockwise when the motor stops, the lever will normally maintain the lockout position shown in FIGURE 15 until one of the code slide levers 22 through 28 is moved. Movement of a code slide lever such as lever 24 moves a pivotly mounted pawl 114 downward by reason of pressure from triangular teeth 116 formed in the under side of each code slide lever. When the pawl 114 moves down, an extension 117 thereof pushes the slide lockout lever 108, making it pivot clockwise and move into the cutout portion at 97a. As a result, the arm 70 can then pivot clockwise to an activating position whereby it can be contacted by the push button. It may be noted that when the slide lockout lever 108 pivots clockwise into the cutout portion at 97a, it covers decoding switch button 58 and terminates the decoding of television signals. Therefore, when a code slide lever 22 through 28 is moved to set a new code, the decoding button 58 is pushed in and decoding of signals terminates; simultaneously, the arm 70 is released so that the mechanism can be activated when the push button is pressed again.

Reference is now made to FIGURE 4 which is a side view of the mechanism taken along the lines 4—4 of FIGURE 2. FIGURE 4 more clearly shows the printing operation which occurs during the single rotation of the motor shaft 146. The decoding unit is provided with a roll 120 of billing tape 121 and a roll 122 of master tape 123. The billing roll 120 contains the paper tape upon which a printout is made of the code, including the three numbers and price, and also eventually of the customer's identification number. The master roll 122 contains, on its under surface, a coating of a transfer material which, upon pressure by type, is transferred to the billing tape 121. By this process the billing tape 121 has printed thereon the required information and the master tape 123 shows the same information by virtue of the absence of the transfer coating where it has been transferred to the billing tape. Both tapes 121 and 123 extend over tape engaging wheels in the form of sprocket wheels 124 which are fixed to sprocket shaft 130.

The billing tape 121 passes over the sprocket, through a slot 126 and into a cavity where it is retained until ejected from the apparatus in a manner to be described more fully in connection with the billing operation. The master tape 123 passes over the sprocket wheel to a take-up roll 128. Both tapes 121 and 123 have sprocket holes for engaging the teeth of the sprocket wheel 124. The sprocket wheel 124 is driven by gears connected to the motor shaft 146, to advance the two paper tapes by a step after a print has been completed so that a new line of tape is in position for printing.

FIGURE 12 is a fragmentary view showing the sprocket wheel actuating mechanism. As stated above, both the billing tape 121 and master tape 123 have holes engaged with the sprocket teeth of the sprocket wheel 124. A sprocket gear, partially shown in FIGURE 12, is mounted on the sprocket shaft, and it is positioned for engaging a tooth of a single tooth wheel 134 fixed to the motor shaft 146. As the motor shaft 146 rotates through a single turn in the manner earlier described, the tooth of the single tooth wheel 134 engages the sprocket gear 132 and moves it by an increment of rotation. The sprocket wheel 124 advances the two tapes by a line and causes a fresh portion of tape to lie in a position for receiving and imprinting.

Figure 5:
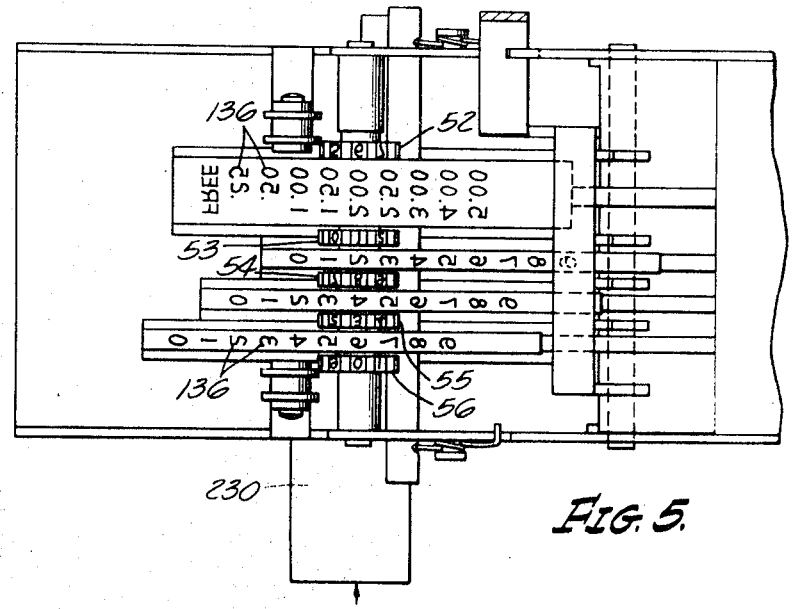
FIGURE 5 is a bottom view of the lid portion of the apparatus, showing the slide bars and code wheels, and is a view taken along the lines 5—5 of FIGURE 4.

FIGURE 4 illustrates the mechanism by which imprints are made on the tapes during the single rotation of the motor shaft 146. Type 136 on the bottom of the code slide levers (also shown in FIGURE 5) prints the characters on the tapes. A plurality of code character printing hammers 138 are pivotally supported on the sprocket shaft 130. The hammers are operated by a plurality of printing cams 142 which are mounted on a printing cylinder 144 that is rotatably fixed to the motor shaft 146. As the motor shaft turns the printing cams 142 lift the printing hammers 138 and cause the paper tapes 121 and 123 to be pressed between the surfaces of the hammers 138 and the type 136 immediately above the hammers. The type face above each hammer 138 is imprinted on the billing tape 121 by removal of the coating on master tape 123.

Figure 6:
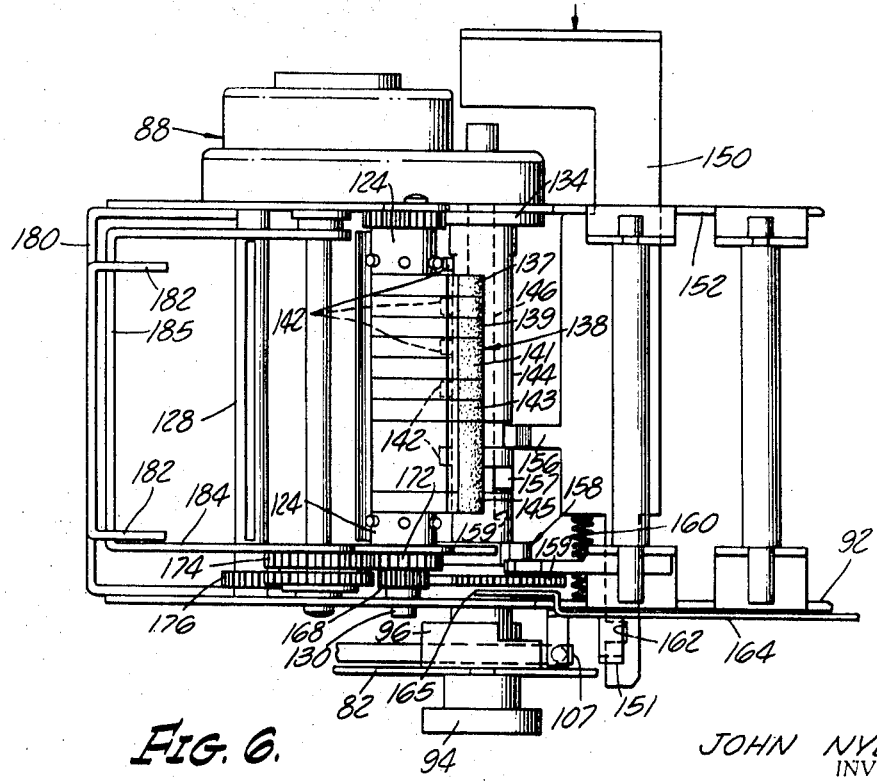
FIGURE 6 is a top plan view of the apparatus taken along the lines 6—6 of FIGURE 4.

FIGURE 6 shows the plurality of printing hammers 138 which are operated by printing cams 142. Only the four printing cams located underneath a printing hammer are used to print the four characters of the code onto the tapes. The other five printing hammers 137, 139, 141, 143 and 145 are used only during a billing cycle, during which the printing cylinder 144 is shifted laterally. The printing cams then rotate under the five other printing hammers to print a customer identification number set on customer wheels 54, as will be later described.

After the apparatus is used for a period of time such as one month, the subscriber must actuate the billing cycle in order to receive a slip of billing tape 121 which lists the programs (by code, including the prices) received during the month, and the customer then sends this tape to the subscription television company together with his check for the sum of prices recorded on the slip. The billing operation is performed by first setting the four code slide levers 22 through 28, shown in FIGURE 2, to the extreme left so that the characters "B," "I," "L" and "L" are displayed through the windows 30 through 36 to indicate that the mechanism is in the "bill" position. A billing lever 150 is then free and can be pushed in, thereby causing the mechanism to deliver a portion of billing tape 121 showing the charges incurred during the billing period. The billing door 180 is then opened to automatically shear off the desired portion of billing tape and to allow its removal from the apparatus.

The details of operation of the mechanism during the billing cycle can be understood by referring to FIGURE 2 which shows the billing lever 150, which has a flange depending upwardly. A lockout lever 230 slidably mounted on the cover 20 prevents the pushing in of billing lever 150 unless the four code slide levers are moved to the left to the "billing" position. As can be seen in FIGURE 4, the code slide levers prevent pushing in the lockout lever unless it is aligned with slots 232 in the code slide levers. Such alignment occurs only when all code slide levers are in the billing position.

Referring now to FIGURE 6, the billing lever 150 is slideably supported on the two side walls 152 and 154 of the mechanism. The billing lever 150 carries a finger 156 which is engaged in a groove in the printing cylinder 144. The printing cylinder is slideably mounted upon the motor shaft 146 (but rotatably fixed to the shaft). When the billing lever 150 is pushed in the printing cylinder 144, which carries the cams that actuate the hammers 138, is slid in the direction of the side wall 154. The billing lever 150 is retained in an inward position by reason of the drop of retaining tab 151 of billing slide retaining lever 164 into a slot 162 formed in the billing lever.

When the billing lever 150 is pushed in, causing its finger 156 to move the printing cylinder 144 toward the side wall 154, the printing cylinder engages a billing cam assembly 158 by reason of the insertion of a tooth 157 on the printing cylinder with a notch 159 formed in the billing cam assembly. As shown in FIGURE 13, downward movement of the retaining lever 164 (which moves down when the billing lever is moved inwardly) moves a motor actuating tab 167 on the retaining lever in a downward direction and causes it to press down a blade 195 of a billing cycle motor switch 196. When switch 196 closes, current passes through the motor 88 and the motor shaft 146 revolves. As the shaft 146 revolves, a lifting tooth 166 of the billing cam assembly 158 lifts end 165 of the billing slide retaining lever 164, thereby releasing the billing lever 150 and opening the switch 196.

The lifting tooth 166 on the billing cam assembly is position so that the billing lever 150 is released only after nearly a complete revolution of the motor shaft 146 so that all of the billing operations can occur during the single revolution. It may be noted that even if the retaining lever 164 is lifted just prior to a complete revolution the shaft 146 will complete the revolution by reason of the other motor switch 90 which is closed until a cam rider 98 described earlier comes to rest in a notch. When the billing lever 150 is released it moves out under the force of a spring 160 shown in FIGURE 6.

While the motor shaft 146 makes a single revolution during the billing cycle, five customer identification numbers are printed on the tape instead of the four code characters. Due to the fact that the printing cylinder 144 shown in FIGURE 6 has been moved toward the side wall 154 and remains in that position during the billing cycle, the printing cams 142 of the printing cylinder are now under a set of customer identification hammers 137, 139, 141, 143 and 145, which are interspersed between the code character printing hammers 142, and these customer identification hammers are raised during the period of the motor revolution. When the customer identification hammers are raised they press the paper tapes against five customer identification wheels shown in FIGURE 5 and designated 52, 53, 54, 55 and 56, which are interspersed between the code slide levers. Each subscriber to the system is given a different set of five numbers and these numbers are printed on the paper tape during the billing operation by reason of the lifting of the five printing hammers immediately under the customer identification wheels. The relative locations of one of the wheels 54, printing hammers 138 and paper tapes 121 and 123 are shown in FIGURE 4.

In the course of the single revolution of the motor shaft 146 during the billing cycle, and after the customer identification numbers are printed on the tapes, the tapes are advanced by several inches so that a length of billing tape 121 can be ejected from the machine and used by the subscriber to pay his monthly charge. FIGURE 13 illustrates the gearing arrangement whereby the tape is advanced by several inches during the billing operation. After the motor shaft 146 rotates about a half turn, during which the printing of customer numbers is accomplished, a gear tooth section 159 on a wheel of the billing cam assembly 158 engages gear 168 which is fixed to the sprocket shaft 130. The sprocket shaft 130 then makes more than one revolution (instead of a fraction of a revolution which occurs during the code printing described earlier) and the paper tapes are advanced by several inches. As the sprocket shaft 130 rotates, a transmission gear 172 on the sprocket shaft rotates and turns idler gear 174. The idler gear 174, in turn, rotates a gear 176 fixed to takeup roller 128 and several inches of master tape is wound on the takeup roller as the tapes pass over the sprocket wheels.

In the course of the billing operation, after the imprinting of the customer identification numbers on the tape and the advancement of the tape by several inches, a door 180 shown in FIGURE 4 is released so that it can be opened to permit the subscriber to take out the portion of billing tape showing his charges. FIGURE 14, which is taken along the lines 14—14 of FIGURE 11 (note that the direction of this view is opposite to that of the other partial views) shows the mechanism whereby the billing door 180 is released at the end of the billing cycle. A door latching lever 184 is normally positioned with its latching bar 185 engaged with a hook 182 of the door to prevent the door from opening. A spring (shown in FIGURE 4 and designated 187) normally retains the door latching lever 184 in the upward position. An unlatching cam 161 of the billing cam assembly 158 has an unlatching tooth 163. When the motor shaft 146 completes its single revolution during the billing cycle, the unlatching tooth 163 comes to rest in the position shown in FIGURE 14, wherein it is under a rider end 183 of the door latching ever 184. When the door latching lever 184 is in this position, the door 180 is free to be opened.

Referring now to FIGURE 4, the door 180 is seen to be supported by extension 190 which pivots about the pivot 192. A pawl 194 pivoted about pivot 196 and biased toward its neutral position shown in FIGURE 5 by spring 197, engages ratchet teeth 188 on the door extension and prevents closing of the door 180 when it is partially open. After the ratchet 194 passes the ratchet teeth 188, which occurs when the door is about half open, the pawl no longer prevents closing of the door since the pawl will be rotated counterclockwise during closing of the door and will not interfere with it.

The door extension 190 has a slot 198 formed therein, on either side of the housing structure, and a pin 200 rides in the slot. The pin 200 is attached to a long knife operating frame 202 which is pivoted about pivot 204. A knife 208 mounted on the knife operating frame and held between blade holding plates 220 which are biased by spring 222, moves up when the frame 202 is moved up. The billing tape 121 passes through a slot 126 across which the knife can pass when it is lifted, and lifting of the knife 208 shears the billing tape 121 to provide a slip of tape to the subscriber when he opens the door. As the door 180 is opened, the pin 200 is moved upwardly by the walls of the slot 198 in the door extension, the knife operating frame 202 is lifted and the knife 208 cuts the tape 121.

When the door 180 is almost half open, the pin 200 rides over a corner portion of the slot 198 and the door 180 cannot then be closed; if an attempt is made to close the door 180, the walls of the slot 198 merely push the pin 200 toward the pivot 208 and the door is stopped. However, when the door is lifted all the way open and the knife blade is raised up to the maximum extent, the knife holding plates 220 hold the knife 208 in an upward position by friction, and the knife operating frame 202 and the pin 200 are held upwardly. The door 180 can then be closed because the pin 200 then abuts against the upper surface of the walls of the slot 198. Thus, the mechanism assures that the door 180 will be opened all the way so that the tape 121 must be cut.

When the door 180 is opened and the knife operating frame 202 is lifted to the maximum extent, a protuberance 224 on the frame 202 is lifted. As can be seen in FIGURE 14, the protuberance 224 strikes the surface 227 of a notch 226 in the unmatching cam 161 and rotates the cam slightly. The rotation is just sufficient to rotate the unlatching tooth 163 so that the rider end 183 of the door latching lever falls onto the unraised portion of the cam 161. The door latching lever 184 then pivots so that the bar 185 is ready to latch the door 180 when it is closed, and the door is then generally closed. The mechanism is then ready for a new activation to decode signals for a television program when the push button is pressed.

In addition to the coding provided by the setting of the four code slide levers 22 through 28, an additional code is provided which can be changed at monthly intervals to prevent unauthorized reception by persons who might otherwise determine which tone generators are designated by each of the ten values of each code character. As shown in FIGURE 4, a printed circuit board 210 is attached to the bottom of the knife operating frame 202 and a punched hole card 214 is positioned below the board. Approximately one hundred spring contacts 212 are positioned on an insulator 213 mounted on a bottom plate of the apparatus. The spring contacts 212 can make electrical contact through holes in the punched card 214 to connect each of the ten tone generators used in decoding television signals to each of ten positions on another printed circuit board shown at 218. Appropriate settings of the four code slide levers 22 through 28 connect the contacts on circuit board 218 through conducting wires 219 to a third circuit board 216 which connects the selected code generators to the electrical decoding apparatus (not shown). One conducting wire 219 is mounted on each of the four code selecting levers 22 through 28.

A bottom view of the punched card 214 showing alignment of the holes therein with the ten conducting strips of the printed circuit board 210 is presented in FIGURE 10. Two holes are used to check for proper positioning of the punched card in its holder, by requiring a completion of a circuit through contacts normally passing through the holes before the activating relay 62 can be closed. Referring to FIGURE 4, the punched card 214 can be withdrawn from the device when the billing door 180 is fully opened and the knife operating frame 202 is raised. A new punched card may be supplied each month to enable reception of programs for the succeeding month.

While the mechanical details of the entire device are shown, the electrical details of the decoding process will not be shown inasmuch as they form no part of this invention.

The foregoing description is an embodiment of a billing and decoding device which performs several functions to facilitate the activation of decoding apparatus, and provide a record of programs accepted and a bill to be paid therefor. While a particular embodiment of the invention has been illustrated and described, it should be understood that many modifications and variations may be resorted to by those skilled in the art, and the scope of the invention is limited only by a just interpretation of the following claims.

I claim:
1. Billing apparatus for use at a receiver in a subscription television system of the type wherein encoded program signals are transmitted, comprising:
   decoding means for decoding said encoded program signals when set to a configuration corresponding to the encoding characteristics of said encoded signals;
   code character indicating means operatively associated with said decoding means for indicating the setting of said decoding means;
   code setting means operatively associated with said decoding means and said indicating means for simultaneously altering the setting of said decoding means and the code character indicating means;
   subscriber activated means connected to said decoding means for causing the delivery to said receiver, of decoded program signals which are decoded in accordance with said setting of said decoding means; and
   record means operatively associated with said code setting means for providing a record of the activations of said activating means and the setting of said code character indicating means upon activation of said subscriber actuated means.

2. Billing apparatus as defined in claim 1 wherein:
   said code character indicating means comprises a pluraliay of sets of characters, a character from each set constituting a part of a code setting, one of said sets of characters comprising a plurality of price indications, whereby a code setting of the apparatus inherently indicates the price charged for the program to be received.

3. Billing apparatus as defined in claim 2 wherein:
   said record means includes a billing tape, means operatively associated with said code setting means and disposed adjacent to said tape for printing symbols on said tape corresponding to said characters, and means for ejecting portions of said biling tape from said billing apparatus, whereby to provide a bill to the subscriber showing the charges for programs viewed.

4. Billing apparatus as defined in claim 3 including:
   a master tape extending adjacent to said billing tape at said means for printing symbols, for receiving imprintings when said billing tape is imprinted; and
   roll means within said billing apparatus for accumulating said master tape, whereby to enable verification of charges incurred.

5. Billing apparatus as defined in claim 2 including:
   means connecting said code setting means and said subscribed activated means for preventing the altering of the setting of said decoding means upon the activating of said subscriber activated means and for a predetermined time thereafter, and for terminating the deliverance of decoded program signals to said receiver upon the changing of said code setting means.

6. Billing apparatus as defined in claim 1 wherein:
   said recording means includes printing apparatus for imprinting on tape and tape for receiving said imprinting; and including
   a housing disposed about said billing apparatus;
   walls defining a billing opening in said housing;
   means disposed in said housing for ejecting said tape from said housing through said billing opening;
   tape advancing means engaged with said tape for advancing said tape through said billing opening; and
   billing lever means disposed on said housing for initiating a billing cycle to eject said tape through said opening.

7. Billing apparatus as defined in claim 5 including:
   customer identification type disposed in said housing; and
   means disposed in said housing for printing said tape with said customer identification type upon the activation of said billing lever means.

8. Billing apparatus as defined in claim 5 including:
   a billing door disposed over said billing opening; and knife means connected to said billing door for shearing said billing tape upon opening of said billing door.

9. Billing apparatus as defined in claim 1 wherein:

said record means comprises a master tape having a coating which is readily removable upon the application of pressure thereto, and a billing tape disposed adjacent to said master tape on the side containing said coating; and including type attached to said code character indicating means and located adjacent to said tape for printing characters on said tape corresponding to the setting of said code setting means; and pressure means disposed adjacent to said tape and operable upon the activation of said subscribed activated means, for pressing said tape against said type to transfer said coating on said master tape to said billing tape.

10. Billing apparatus as defined in claim 1 wherein:

said code setting means includes a plurality of slides slidably mounted in said apparatus, each slide having electrical contacts for establishing a different code setting for different positions of said slide, each slide having a type face for presenting printing type to print characters corresponding to the code characters which indicate the setting of said code setting means; and said record means includes a tape path extending adjacent to said type faces of said slides, tape disposed in said apparatus and extending along said tape path, and means disposed adjacent to said tape path for printing characters on said tape corresponding to said type faces on said slides.

11. Billing apparatus as defined in claim 9 wherein:

said means for printing characters includes a plurality of code printing hammers pivotally mounted on said apparatus on a side of said tape path opposite said type faces on said slides and movable against said tape, a printing cylinder disposed adjacent to said code printing hammers and having printing cams thereon for moving said code printing hammers against said tape, and motor means for turning said printing cylinder.

12. Billing apparatus as defined in claim 10 including:

a plurality of customer identification type faces interspersed between said slides;

a plurality of customer identification printing hammers interspersed between said code printing hammers; and means for shifting said printing cylinder along its axis for bringing said printing cams thereon against said customer identification printing hammers to print customer identification characters on said tape.

13. Billing apparatus as defined in claim 1 including:

type disposed on said code setting means;

tape movable past said type for receiving imprintations of said tape;

printing hammers pivotally mounted on said apparatus and movable against said tape for pressing said tape against said type;

printing cylinder means for activating said printing hammers, said printing cylinder means rotatably fixed to a drive shaft disposed on said apparatus;

motor means connected to said drive shaft for turning it;

sprocket wheel means engaged with said tape for advancing said tape; and intermittant gear means mounted on said drive shaft for intermittently turning said sprocket means to cause the advancement of said tape at times other than the period during which said printing hammers are against said tape.

14. Billing apparatus as defined in claim 12 including:

billing lever means disposed on said apparatus for initiating a billing cycle;

a billing cycle sprocket gear;

means operably engaged with said billing lever means for engaging said drive shaft with said billing cycle sprocket gear to drive said sprocket gear during said billing cycle and substantially advance said tape;

a billing door pivotally mounted on said billing apparatus;

knife means operably connected to said billing door for shearing said tape upon the full opening of said billing door; and means operably associated with said billing door for preventing the closing of said door until it is fully opened.

15. Billing apparatus for subscription television systems comprising a housing;

window means defined by said housing for displaying code characters;

a plurality of code setting slides slidably mounted on said housing, said slides including:

code characters disposed longitudinally along said slide for display through said window means;

electrical contact means thereon for establishing decoding settings, and type thereon representing said characters, disposed longitudinally along the slides for imprinting on a record;

a motor mounted on said housing, having a motor shaft;

motor switch means connected to said motor for energizing it;

latching means operably associated with said motor switch for holding said motor switch closed for an entire revolution of said motor shaft after a temporary closing of said switch;

a switch activating arm mounted on said housing for at least momentarily closing said motor switch;

a setting arm pivotally mounted on said switch activating arm for selective positioning to receive and avoid the receipt of activating forces;

a pushbutton mounted on said housing for movement against said setting arm to transmit activating forces that cause said switch activating arm to close said motor switch;

a restraining arm mounted on said housing for selectively preventing the positioning of said setting arm for the receipt of activating forces from said pushbutton, and freeing said setting arm;

relay means electrically connected to said electrical contact means for positioning said restraining arm in a position which frees said setting arm when said code setting slides are set to a code which properly decodes information signals;

a printing cylinder having printing cam, mounted on said motor shaft; and code character printing hammers pivotally mounted on said housing adjacent said printing cylinder for movement by said cams toward and away from said type on said code setting slides.

16. Billing apparatus as defined in claim 15 including:

a plurality of customer type faces interspersed between said type on said code setting slides;

a plurality of customer code printing hammers interspersed between said code character printing hammers;

means operatively associated with said printing cylinder for shifting it axially to cause said printing cams thereon to operate said customer printing hammers when said motor shaft turns;

a tape engaging wheel rotatably mounted on said housing;

a tape path within said housing etxending through an area between said type representing said characters and said code character printing hammers and extending past said tape engaging wheel; and gear means engagable with said printing cylinder when it is shifted axially, for driving said tape engaging wheel.

References Cited

UNITED STATES PATENTS

| | | | |
|---|---|---|---|
| 3,142,722 | 7/1964 | Terek | 178—5.1 |
| 3,147,061 | 9/1964 | Walker et al. | 178—5.1 X |
| 3,244,806 | 4/1966 | Morris | 178—5.1 |

RICHARD A. FARLEY, Primary Examiner

M. F. HUBLER, Assistant Examiner